(12) United States Patent
Klein et al.

(10) Patent No.: US 10,478,760 B2
(45) Date of Patent: Nov. 19, 2019

(54) FILTER ELEMENT WITH A LUMINESCENT MARKER

(71) Applicant: HYDAC FILTERTECHNIK GMBH, Sulzbach/Saar (DE)

(72) Inventors: Volkmar Klein, Zweibruecken (DE); Claudia Brocker, Saarbruecken (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 15/323,756

(22) PCT Filed: Jun. 9, 2015

(86) PCT No.: PCT/EP2015/001156
§ 371 (c)(1),
(2) Date: Jan. 4, 2017

(87) PCT Pub. No.: WO2016/005020
PCT Pub. Date: Jan. 14, 2016

(65) Prior Publication Data
US 2017/0165595 A1   Jun. 15, 2017

(30) Foreign Application Priority Data
Jul. 9, 2014   (DE) .................. 10 2014 010 175

(51) Int. Cl.
*B01D 35/00* (2006.01)
*B01D 29/21* (2006.01)
(Continued)

(52) U.S. Cl.
CPC ......... *B01D 29/213* (2013.01); *B01D 27/005* (2013.01); *B01D 29/235* (2013.01);
(Continued)

(58) Field of Classification Search
USPC ............ 118/102; 156/196, 443; 210/85, 94; 264/1.31; 425/174.4
See application file for complete search history.

(56) References Cited

U.S. PATENT DOCUMENTS 5,622,624 A * 4/1997 Lauer ................... B01D 29/111
                                                              210/232
2007/0251875 A1* 11/2007 Koch ..................... B01D 29/15
                                                              210/243
(Continued)

FOREIGN PATENT DOCUMENTS

DE   10 2004 061 078   6/2006
DE   10 2006 028 161   12/2007
(Continued)

OTHER PUBLICATIONS

International Search Report (ISR) dated Aug. 17, 2015 in International (PCT) Application No. PCT/EP2015/001156.
(Continued)

*Primary Examiner* — Hayden Brewster
(74) *Attorney, Agent, or Firm* — Wenderoth, Lind & Ponack, L.L.P.

(57) ABSTRACT

A filter element for fluid filtration, in particular for hydraulic fluid, has element components, such as pleated and multi-layer filter material (10) that extends between two end caps (26) and has a fluid-permeable supporting tube (14) forming a hollow cylinder. At least one element component of the filter element is provided at least partially with at least one luminescent material or marker such that the material or marker is excited to a characteristic, detectable wave emission when exposed to a certain exciter wave or wave spectrum.

16 Claims, 3 Drawing Sheets

(51) Int. Cl.
*B01D 27/00* (2006.01)
*B01D 29/23* (2006.01)
*B01D 29/58* (2006.01)
*D21H 21/48* (2006.01)
*D21H 27/08* (2006.01)
*F02M 37/22* (2019.01)

(52) U.S. Cl.
CPC ........... *B01D 29/58* (2013.01); *B01D 35/005* (2013.01); *D21H 21/48* (2013.01); *D21H 27/08* (2013.01); *B01D 2201/291* (2013.01); *B01D 2201/52* (2013.01)

(56) References Cited

U.S. PATENT DOCUMENTS

| | | |
|---|---|---|
| 2009/0101554 A1 | 4/2009 | Kreiner et al. |
| 2009/0205302 A1 | 8/2009 | Rieger |
| 2010/0163747 A1 | 7/2010 | Schwenk et al. |
| 2011/0259796 A1* | 10/2011 | Chen .................. B01D 29/232 208/187 |
| 2012/0160747 A1 | 6/2012 | Striebich et al. |
| 2012/0205044 A1* | 8/2012 | Mees .................... B01D 29/111 156/294 |
| 2014/0001376 A1* | 1/2014 | Liu ........................ A62B 9/006 250/461.1 |
| 2014/0103226 A1 | 4/2014 | Lopez Quintela et al. |

FOREIGN PATENT DOCUMENTS

| | | |
|---|---|---|
| DE | 20 2010 001 721 | 12/2010 |
| EP | 0 001 407 | 4/1979 |
| EP | 0 052 624 | 6/1982 |
| EP | 0 680 411 | 11/1995 |
| EP | 2 050 489 | 4/2009 |
| WO | 2006/005498 | 1/2006 |
| WO | 2012/172018 | 12/2012 |

OTHER PUBLICATIONS

Loïc J. Charbonnière, "Luminescent Lanthanide Labels", In: Current Inorganic Chemistry, vol. 1, No. 1, pp. 2-16—ISSN 1877-9441, 2011, cited in the German Examination Report.

* cited by examiner

FILTER ELEMENT WITH A LUMINESCENT MARKER

FIELD OF THE INVENTION

The invention concerns a filter element for fluid filtration, in particular for hydraulic fluid, comprised of element components such as a preferably pleated multi-layer filter material that extends between two end caps and that at least partially comprises a fluid-permeable supporting tube forming a hollow cylinder.

BACKGROUND OF THE INVENTION

Filter elements of this kind are readily available on the market in a plurality of designs. Such filter elements, as they are described for example in DE 10 2004 061 078 A1 and EP 0 001 407 B1, are designed to be inserted into a filter housing for the purpose of cleaning dirty fluid, for example in form of a hydraulic medium, through the inserted filter material of the filter element, and to return the cleaned fluid from the filter housing back into the fluid circuit, in particular a hydraulic fluid circuit. If after a plurality of filter cycles the filter material is blocked with dirt to the degree that it is unusable, the filter element is removed from the housing and replaced by a new element.

To increase the filtering surface, the filters are usually made of a star-shaped folded or pleated strip of filter mat, which concentrically surrounds an internal and/or external supporting tube in a circular manner. The filter material with its cross-sectional star-shaped arrangement of filter pleats is able to brace against an internal or external supporting tube depending on flow direction. To that extent, the filtration direction can be reversed so that reverse flushing actions with already cleaned fluid are possible. In his way, a filter material that is clogged with contaminating particles can be cleaned. The filter material as such has a multi-layer mat structure. The respective layer arrangement is dependent on the required filtration task. Nevertheless, layer arrangements are often used that have purely filtering or draining layers that are made from native fibres, glass fibres, metal fibre material and synthetic fibres such as meltblown fibres, carbon fibres and so on. To ensure the secure adherence of the layers to each other, the two cover layers of the filter material can be made from a finely woven synthetic or wire fabric as the respective supporting fabric, which also prevent the washing out of fibre material during operation of the filter element.

The disadvantage of such filter elements, which are on the market in many different forms and designs and which are widely used, for example, in hydraulic systems where hydraulic oil flows through system branches, is that they are often on the market as counterfeit products without guaranteed characteristics and labelling. Furthermore, often low-quality counterfeit products appear on the market that bear the original company logos and manufacturer's details, and thus, obscure the facts and mislead consumers regarding the actual source of the filter element product.

With specified filter characteristics such as differential pressure stability, beta stability, filter fineness in conjunction with purity class, dirt absorption capacity, long-term service characteristics and such, many different hydraulic-related filter tasks can be met if and as long as original filters from reputable manufacturers are used and not low-quality counterfeit products that usually come from low-wage countries and illegally enter the world-wide market.

Due to increased quality requirements, which are also the result of the complexity of modern machines and plants that operate with hydraulic components, it is indispensable that, for the specified filter task, the filter element used is preferably designed specifically for the required filter characteristic. In particular in the instance where the application of the filter element fluid filtration involves a security-related technology, the breakdown or malfunction of the filter element could lead to serious damage of machines and/or injury to persons.

This danger is always present where counterfeit products or technically inferior copies are used that do not come with reliable product information. Due to the illegal use of company details, such as logos and company names, the counterfeit products are erroneously attributed to the original manufacturer, who may then be held accountable by the operator for the damage done to machines and plants caused by the counterfeit products.

SUMMARY OF THE INVENTION

Based upon the above described problem an object of the invention to provide the manufacturer of the filter element with a tool that enables the manufacturer to identify elements already supplied and in use as its own, even if counterfeits products have been made by third parties. Moreover, if required, the manufacturer can receive information about the supplied filter element on site.

This object is basically achieved by a filter element with at least one element component of the filter element that is at least partially provided with a luminescent material or marker. When that material or marker is excited to a characteristic, detectable wave emission when exposed to a certain exciter wave or wave spectrum, installation or service personnel sent by the original manufacturer are able to reliably determine on site, that is, at the location of use of the respective filter element, whether this filter element product originates from the manufacturer or not. The assessment on site may be able to be made with the naked eye. However, preferably a specifically adapted acquisition and evaluation unit is provided that makes the luminescent material or marker provided on the filter element recognisable to an observer.

If the luminescent material or marker had been provided by the manufacturer with readable information, the information read out on site can be used to again obtain the technical information, for example, regarding the manufacturing series the element comes from, when and in which plant it had been manufactured, what filtration characteristics are inherent in the element material, etc. Based upon this technical information, in case of malfunction and provided that the element really is an original element of the manufacturer, the production of such elements can be changed in such a way that any malfunctions are avoided in future. Since this marking is a completely new method for element identification and assessment, from today's point of view, one cannot foresee all possible applications and uses of the invention. The solution according to the invention has therefore no parallel in the prior art.

In a preferred embodiment of the filter element according to the invention the luminescent material or marker is of an organic nature and is provided in form of a fluorescent material, comprising at least a host lattice and an activator that is preferably present in ionic form. This material or marker is responsible for the emitted wave image, in particular in form of light. Due to the use of a fluorescent material, a particularly good identifiability of the element information to be read out is assured, so that a reliable identification is achieved, even on difficult to access machine and plant parts in a dark environment.

Preferably, the host lattice is made from oxidic materials, preferably $Y_2O_3$ or $Lu_3Al_5O_{12}$. The materials used as activators are preferably rare earths and/or transition metals such as manganese, chromium or iron. Particularly when using rare earths, which are relatively expensive on the market, advantageously they are introduced in ionic form into the host lattice since the small quantity of rare earths keeps the cost down. Since users consider filter elements only as low-cost consumables, the identification system according to the invention must not be too costly so as not to increase the overall price to the user significantly.

If oxidic materials are used for the host lattice, the host lattice can be made very stable and abrasion-resistant for the activator that causes the actual fluorescence. In the rough day-to-day operation of the filter element, the marking characteristic of the activator is then not accidentally diminished.

In a further preferred embodiment of the filter element according to the invention, to achieve a strong reflection on the surface of the respective element component, short-wave, in particular ultraviolet (UV) light is used. For deeper material layers that are located below the surface, long-wave light, in particular infrared (IR) light is used. In order to analyse these types of luminescent materials, light spectroscopy is particularly suitable, since all sections of the light spectrum, such as the UV/VIS/IR spectres can be detected reliably.

The very short-wave identification light that is used, which is invisible to the human eye, is partially absorbed and re-emitted by the luminescent material or marker used. This arrangement results in long-wave light being reflected, which is directly visible to the human eye. An alternative possibility is that short-wave light is reflected that is not visible to the human eye, but is verified specifically by a spectroscopy method.

The particle size of the luminescent material pigments is preferably less than 1 µm so that the pigments can easily be mixed into adhesives or inks to ensure that even a small amount of mixed-in pigments makes a reliable later identification of the filter element possible. At least purely mathematically in this manner, 300 billion combinations of unique "fingerprints" can possibly be generated that are still clearly distinguishable in their spectral behaviour, providing a system that is almost forgery-proof and impossible for the counterfeit producer to copy the special fingerprint applied by the original manufacturer. This system permits ensuring a reliable differentiation between the original and the counterfeit product on site, and thus, also by the user of the product.

As already described, the fluorescent material used for the marking of filter elements is provided as a kind of ink, or is in an adhesive, preferably mixed into a single or multiple-component adhesive. That adhesive permits the individual element components to be at least partially be connected to each other and form the filter element.

The adhesive that contains the fluorescing material serves preferably to attach the filter mat ends of the filter material to each other and/or to attach the end of the filter material to at least one of the end caps of the filter element.

The individual filter folds of the pleated filter material are spaced and fixed in the adhesive bed of the end cap of the filter element in such a way that a direct optical or other sensoric recognition of parts of the respective adhesive bed with the infused marker between adjacent filter folds is possible.

A further possibility for marking the components that are used in the manufacture of filter elements, for example the plastic (PET) sleeve as the outer supporting tube cover, the end caps, the O-rings as seals, the bypass valve or the filter material itself can take place in that a special tincture that is comprised of ink in which luminescent material is suspended or dispersed, is applied as fluorescent marker. The application may be in form of a printing method, for example through pad printing, so that uneven surfaces can be printed on. There is also the possibility of mixing the luminescent or marker material directly into the adhesive or the elastomeric material with which the components are manufactured.

Beside the ink as carrier for luminescent materials, single-component or two-component epoxy resins and polyurethane are also suitable. In the same manner it is possible to use other chemically curing adhesives that cure according to the principle of polyaddition, polycondensation or polymerisation to a thermoset, thermoplast or elastomer. All adhesives can be processed as single-component or two-component variations and infused with fluorescent markers. The fluorescent marker as luminescent material is dispersed or suspended in the adhesive and is permanently embedded in the adhesive material through cross-linking and curing of the adhesive, so that the marking remains intact even after a long storage period and over many operating hours.

Moreover, the invention may also be implemented using a physical curing adhesive.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are shown in principle and are not to scale.

DETAILED DESCRIPTION OF THE INVENTION

Figure 1:
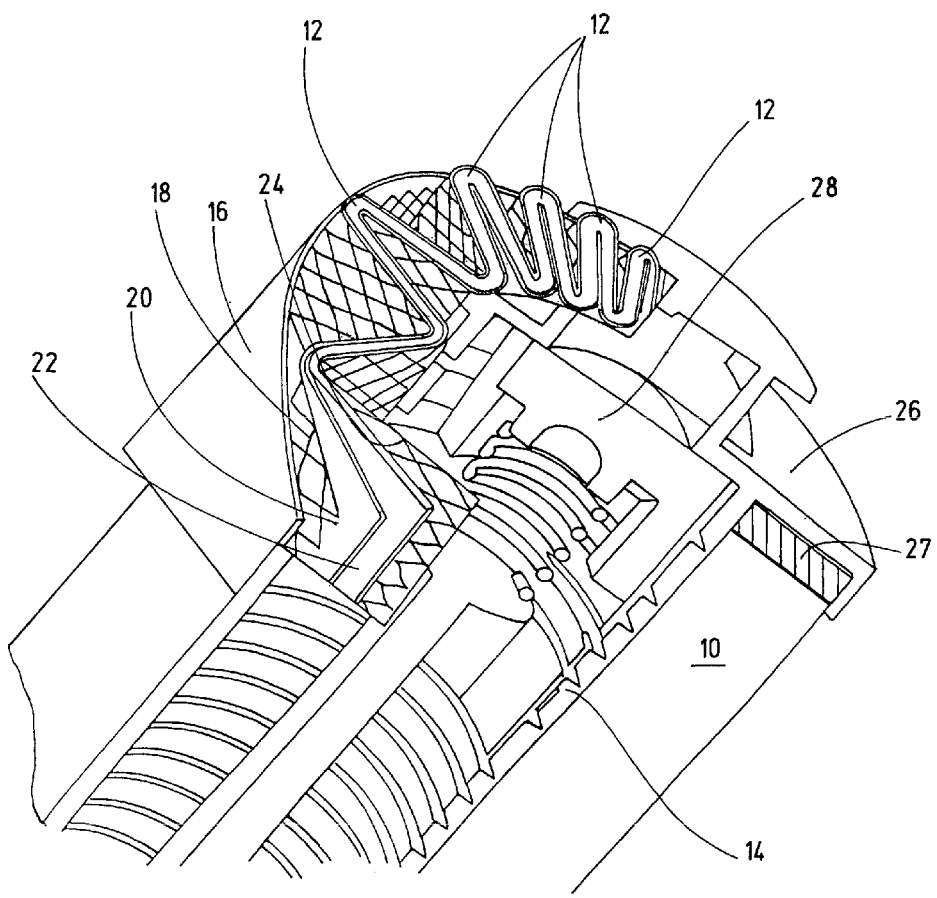
FIG. 1 a partial perspective view in section of one end of a filter element according to an exemplary embodiment of the invention.

The filter element, of which the upper half is depicted in FIG. 1 and which is part of the prior art (DE 10 2004 061 078 A1), features as filter component a filter mat 10 with a defined surface area and defined filter characteristics. The filter mat may be formed as a cylinder (not shown) or, as depicted in FIG. 1, may be folded or pleated with individual filter folds 12, which extend tightly packed between an inner, fluid-permeable supporting tube 14 and an outer cylindrical housing mantle, or supporting tube casing 16 respectively, which is also fluid-permeable. The individual filter folds 12 are shown partially pulled apart to make the illustration clearer, where the individual layer structure of the pleated filter mat 10 becomes apparent from the partial depiction that faces the viewer.

In filter elements of this design, the filter mat 10 has usually of a first layer as the supporting fabric 18, a second layer 20 as protection fleece, a third layer 22 as main fleece, possibly a further not-depicted layer of a subsequent protective layer, and certainly a fourth layer 24 of another supporting fabric 24 that extends around the inner circumference. The supporting fabrics 18, 24 may be made from a wire fabric, a plastic mesh or a plastic fabric. The protection fleece layers 20 are usually made from a synthetic fleece. The main fleece layer 22 has materials such as glassfibre paper, synthetic filter material (meltblown fibres), as well as cellulose paper. These layers may also be assembled from composite materials of the same or different kind. This structure is commonly used for hydraulic filter elements, and thus, does not require a more detailed description.

The filter mat 10 as filter component has, depending on its layer structure and the filter materials used, defined filter characteristics that are guided by the filtration task to be achieved. The basic requirement here is a high differential pressure stability as well as a high beta stability across a wide differential pressure range, defined filter fineness for all purity classes, large dirt absorption capacities as well as a long service life and a small physical size, if required.

Looking at FIG. 1, the flow direction in the known solution through the filter mat 10 is from outside to inside and is braced at its inner circumference with its folding edges against the outer circumference of the plastic supporting tube 14 with its annular fluid ports. Each of the filter mat ends is received by an end cap, where FIG. 1 shows the upper end cap 26 only. That filter mat end is received in an adhesive bed 27 inside end cap 26 and is solidly attached thereto. Moreover, the upper end cap 26 comprises a spring-loaded bypass valve 28, which allows fluid to pass for safety reasons even if the filter mat 10 is caked with dirt or blocked respectively.

Figure 2:
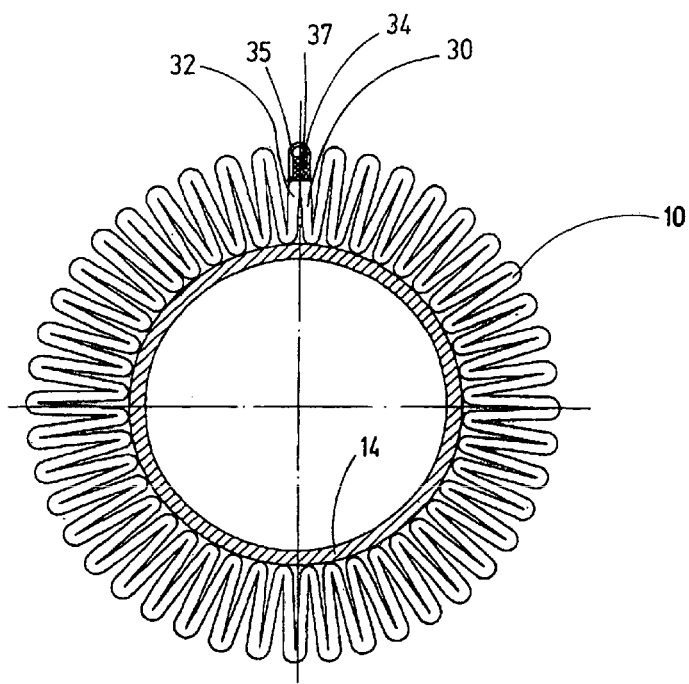
FIG. 2 is an end view in section of the filter element shown in FIG. 1.

As is apparent from the cross-sectional diagram of the filter element according to FIG. 2 and seen in circumference direction of the pleated filter mat 10, the two free longitudinal end edges 30, 32 are brought together by a U-shaped longitudinal seam clip 34. The connection between longitudinal seam clip 34 and the two longitudinal edges 30, 32 is ensured through an adhesive bed 35. This design is commonly used and is described in detail in the prior art in form of EP 1 409 106 B1. The respective bonding of the adhesive beds 27 and 35 is achieved through the use of an adhesive that contains fluorescent particles, where the respective adhesive bed 27, 35 takes the form of a casting compound and establishes the connection of the filter mat 10 with the respective end cap 26 as well as the connection of the free longitudinal edges 30, 32 to each other by the longitudinal seam clip 34. Moreover, filter element solutions are possible in which the bonding of the longitudinal edges 30, 32 can take place without the longitudinal seam clip 34 (not shown). Basically, single or two-component adhesives may be used as bonding agents. Moreover, a physical curing adhesive may also be used to achieve that.

Figure 4:
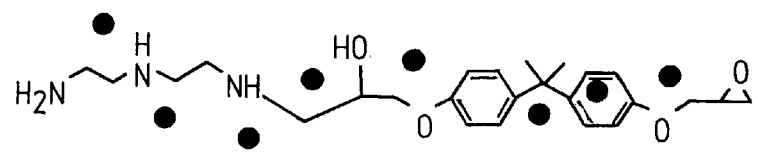
FIG. 4 is an illustration of the arrangement of fluorescent markers in a two-component epoxy resin where fluorescent markers are shown symbolically as circles or points and where each circle or point corresponds to a host lattice with embedded activators.

The FIG. 4 depicts an example of a two-component epoxy resin (2-component system), where the resin contains diepoxides or polyepoxides on the basis of bisphenol A Novolacs®. The curing agents used are polyamines, thiols as well as anhydrides. The adhesive is cured through polyaddition, which results in a duromer after curing. The fluorescent markers are then integrated into this two-component epoxy resin base structure, symbolically shown in form of points or circles respectively in the epoxy resin.

Figure 5:
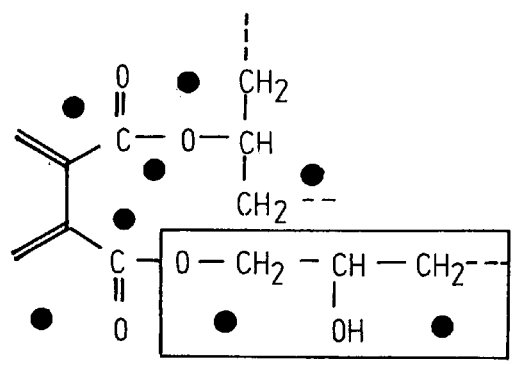
FIG. 5 is an illustration of the arrangement of fluorescent markers in a single-component epoxy resin where fluorescent markers are shown symbolically as circles or points and where each circle or point corresponds to a host lattice with embedded activators.
Figure 6:
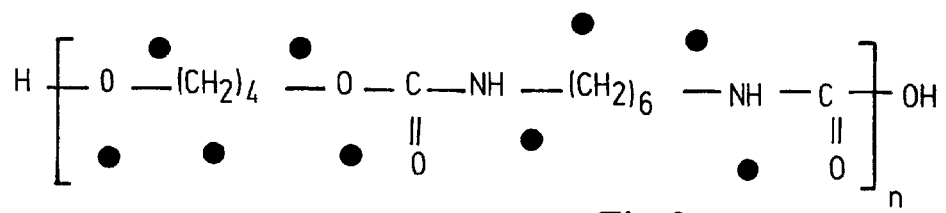
FIG. 6 is an illustration of the arrangement of fluorescent markers in a two-component polyurethane material where fluorescent markers are shown symbolically as circles or points, where each circle or point corresponds to a host lattice with embedded activators.

FIG. 5 shows the example of a one-component epoxy resin (one-component system) as suitable adhesive for the embedding of the fluorescent markers, where the resin is basically formed from a carboxylic acid anhydride and an epoxy resin chain with hydroxyl groups. FIG. 6 in contrast shows as example a two-component polyurethane system (two-component system) based on hexamethylene diisocyanate with 1,4-butylene glycol. The fluorescent markers embedded into the adhesive base are also shown in FIGS. 5 and 6 symbolically as points and circles respectively.

To obtain the respective fluorescent marker, fluorescent substances are used that are mainly formed from elements of "rare earths". These are listed under the numbers 21, 39 as well as 57 to 71 in standard periodic tables. Those substances have a fluorescent effect through excitation with a certain light wave spectrum, for example UV light. The organic luminescent material as a whole, which is used as fluorescent marker, has a host lattice as well as activator ions that are responsible for the emitted light. Suitable as host lattice are mainly oxidic materials, such as $Y_2O_3$ or $Lu_3Al_5O_{12}$, for example due to their high stability. The usual activators that are used are the already mentioned rare earths as well as transition metals such as manganese, chromium or iron. The fluorescent marker that may be specifically formed this way is represented symbolically in FIGS. 4 to 6 by points or circles.

If the above-mentioned fluorescent substances, which could be called luminescent material pigments, are irradiated with short-wave light that is invisible to the human eye, that light is partially adsorbed and reemitted. The fluorescent marker arrangement may be chosen such that the short-wave light is reflected as long-wave light by the carrier of the fluorescent marker, which can be seen directly by the human eye. Alternatively, the irradiated, short-wave light can also be reflected as short-wave light, which cannot be seen by the human eye, but can be detected with analysis and evaluation units based on spectroscopy.

Figure 3:
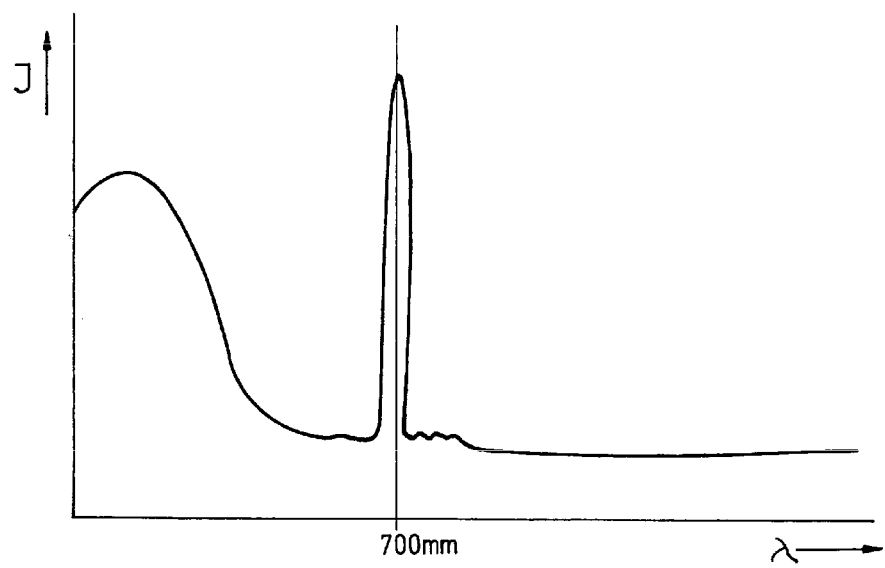
FIG. 3 is a graph of emission spectrum of an emitted, individual light spectrum of a marker after excitation through UV light according to an embodiment of the invention.

An example of such an emission spectrum of specially developed fluorescing substance (fluorescent marker) is shown in FIG. 3, which is embedded in the adhesive according to one of the above described systems. FIG. 3 shows the intensity I of the light reflected from the fluorescent marker over the wavelength λ. As is apparent from the peak representation in FIG. 3, a significant reflection marker is set, for example, at 700 nm. Based on the measured emission spectrum, the filter element product that has been marked with the fluorescent marker can then be easily identified as an original product. In the same manner a product may be recognised as counterfeit because it does not have such an emission spectrum, or is marked with one that has a differently shaped peak.

The basic principle is that every fluorescent substance emits an individual light spectrum after excitation through a light source, for example UV light. Although not detectable by the human eye, the emission spectrum shown in FIG. 3 can be verified with the aid of stationary spectroscopy equipment in a laboratory, but also on site using portable equipment. Received spectra in the ultraviolet range, in the infrared range and in the visual range can, moreover, be digitised and can be compared to the manufacturing data of the manufacturer held responsible by suitable communication facilities.

With spectroscopic methods, the characteristic spectrum can be analysed to receive an unambiguous identification that is comparable to a genetic fingerprint. Since various fluorescing substances can be mixed, and thus, generate new fingerprints through superimposition of the reflected wave emission, recreating the resulting individual emission spectrum by a counterfeit manufacturer is hardly possible. The described identification system then is to be considered forgery-proof. Moreover, in the same manner, technical information can be generated via the fluorescent marker, which can then be read out to receive additional information, for example, concerning the manufacturing location and method of the filter element thus marked.

The fluorescent marker used is also forgery-proof due to the fact that, for example, the type, the origin, the purity but also the particle size of the raw materials used plays a significant role in the manufactured, unique emission spectrum. Also, the method of manufacturing the luminescent material pigments, for example based upon sol-gel processes, or the type of a solid-state reaction has an effect on the resulting characteristic emission spectrum, just like the production temperature, for example, the heating time or the kind of crucible used, which increases the security from unwanted forgeries through counterfeit manufacturers. Since the individual filter folds 12 of the filter mat 10 are spread open in the respective end cap 26 and retained through the adhesive bed 27, direct optical access can be gained from outside to view the respective fluorescent marker used. This access applies also in the instance where the longitudinal filter edges 30, 32 with the adhesive bed 35 are connected to each other and sealed with suitable fluorescent markers. The marking may be placed on the filter element in discrete, selected places, which makes it difficult to find for a potential forger and also contributes to the level of security.

Further locating options are to mix the respective fluorescent marker into the synthetic materials of end caps 26, longitudinal seam clips 34, components of a bypass valve 28 and similar. Another possibility is to mix the respective fluorescent marker also into the elastomer material of seals, for example in form of O-rings (not shown). Since the fluorescent markers can not only be mixed into an adhesive and/or synthetic material, but can also be applied to the element as a fluorescent ink, for example in form of pad printing or a roll-on process, the respective marker can be applied on these filter elements as part of the labelling process on the outer housing mantle 16, for example. Moreover, the fluorescent marker also can be embedded into the layers of the filter mat 10.

As already mentioned, depending on the pigment used which, for example, is invisible to the human eye, potential counterfeit producers may not even know that the filter element is provided with copy protection at all. Considering the plurality of possible application locations, as described above, it is difficult for a forger to even search for the copy protection in the correct location. But even if this location is found, due to the complexity of the emission spectra available to choose from and to construct, it is difficult for the forger to emulate the copy protection.

In summary, with the above described filter element solution, an effective copy protection system is achieved that is economical to implement. This system has no parallel in the prior art.

While various embodiments have been chosen to illustrate the invention, it will be understood by those skilled in the art that various changes and modifications can be made therein without departing from the scope of the invention as defined in the claims.

The invention claimed is:

1. A filter element for fluid filtration, comprising:
a filter mat with a first axial end;
a fluid-permeable supporting tube being a hollow cylinder adjacent said filter mat;
a first end cap having a recess receiving said first axial end of said filter mat; and
a luminescent marker mixed in and not merely on an adhesive bed in said recess joining said first axial end of said filter mat to said first end cap, said luminescent marker being excited to a characteristic and detectable wave emission when exposed to at least one of a certain exciter wave or wave spectrum, being organic and being a fluorescent material,
said fluorescent material including a host lattice and an activator producing an emitted wave image,
said host lattice being made of an oxidic material,
said activator being made of at least one of rare earth or transition metals.

2. A filter element according to claim 1 wherein
said filter mat comprises a pleated multi-layer filter material extending between said first end cap and a second end cap.

3. A filter element according to claim 1 wherein
said activator is in an ionic form.

4. A filter element according to claim 1 wherein
said emitted wave image is light.

5. A filter element according to claim 1 wherein
said oxidic materials are at least one of $Y_2O_3$ or $Lu_3Al_5O_{12}$.

6. A filter element according to claim 5 wherein
said activator comprises at least one of manganese, chromium or iron.

7. A filter element according to claim 1 wherein
said activator comprises at least one of manganese, chromium or iron.

8. A filter element according to claim 1 wherein
a surface of said adhesive bed is capable of achieving a strong reflection from short-wave light; and
deeper material layers of said adhesive bed is capable of achieving a strong reflection from long-wave light.

9. A filter element according to claim 8 wherein
said short-wave light is UV light.

10. A filter element according to claim 8 wherein
said long-wave light is IR light.

11. A filter element according to claim 8 wherein
said adhesive bed is capable of absorbing said short-wave light that is invisible to human eyes and is capable of least one of re-emitting long-wave light that is visible to human eyes or reflecting short-wave light that can be detected by spectroscopy.

12. A filter element according to claim 1 wherein
said activator is selectable from different choices allowing creation of an individual fingerprint for particle filter element characteristics.

13. A filter element according to claim 1 wherein said activator is in particle form in a size less than 1 μm.

14. A filter element according to claim 1 wherein said adhesive bed is at least one of a single-component or multiple-component adhesive.

15. A filter element according to claim 1 wherein said filter mat comprises pleated filter material with individual folds spaced apart and fixed in said adhesive bed in said first end cap affixing said first end cap to said pleated filter material allowing optical recognition of parts of said adhesive bed between adjacent ones of said individual folds.

16. A filter element for fluid filtration, comprising:
filter element components including a tubular filter mat and end caps on axial ends of said filter mat;
a fluid-permeable supporting tube being a hollow cylinder adjacent the filter mat; and
a luminescent marker mixed directly in and not merely on an adhesive directly joining at least one of said end caps to one of said axial ends of said filter mat, said luminescent marker being excited to a characteristic and detectable wave emission when exposed to at least one of a certain exciter wave or wave spectrum, being organic and being a fluorescent material, said fluorescent material including a host lattice and an activator producing an emitted wave image, said host lattice being made of an oxidic material, said activator being made of at least one of rare earth or transition metals.

* * * * *